US006742777B2

(12) United States Patent
Sakurai

(10) Patent No.: US 6,742,777 B2
(45) Date of Patent: Jun. 1, 2004

(54) CLAMPING DEVICE

(75) Inventor: Jirou Sakurai, Kumamoto (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/286,794

(22) Filed: Nov. 4, 2002

(65) Prior Publication Data

US 2003/0094743 A1 May 22, 2003

(30) Foreign Application Priority Data

Nov. 16, 2001 (JP) ....................................... 2001-351634

(51) Int. Cl.[7] ................................................. B23Q 1/04

(52) U.S. Cl. ............................. 269/50; 269/51; 269/71; 269/69

(58) Field of Search ................................ 269/237–239, 269/71, 82, 83, 74, 63, 50, 51, 91–94, 69; 403/166

(56) References Cited

U.S. PATENT DOCUMENTS 2,703,028 A * 3/1955 Goodwill ..................... 269/71
3,382,742 A * 5/1968 Gibbs .......................... 269/91
4,564,179 A * 1/1986 Hollingsworth .............. 269/71
5,415,384 A * 5/1995 Obrist et al. ................ 269/309
5,687,962 A * 11/1997 Goodrich .................... 403/321

FOREIGN PATENT DOCUMENTS

JP 59-169739 A 9/1984

* cited by examiner

*Primary Examiner*—Robert C. Watson
(74) *Attorney, Agent, or Firm*—Birch, Stewart, Kolasch & Birch, LLP

(57) ABSTRACT

A one way clamp mechanism C is composed of a clamping section 7 provided with a clamp pawl 10 and a locking section 8 in which an outer guide 22 of the clamping section 7 is slidably provided on a smaller diameter section 31 of the locking section 8. The one way clamp mechanism C is also composed of an inclined plane 28 provided on the outer guide 22, a lock ball 33 housed in a long opening 32 of a small diameter section 31, and a first spring 34. The lock ball 33 is biased to move in a locking direction (shown by the arrow A) by the first spring 34 and the clamping section 7 is biased to move in a locking direction by a second spring 37.

13 Claims, 4 Drawing Sheets

CLAMPING DEVICE

BACKGROUND OF THE INVENTION

1. Field of the Invention

The present invention relates to a clamping device for use in an assembly process of a workpiece such as a motorcycle engine in which the workpiece is supported on a work bench, and more particularly to an efficient clamping operation. The clamping operation includes both movements for clamping and unclamping the wirkpiece.

2. Description of the Prior Art

A clamping device for a motorcycle engine is disclosed in Japanese Unexamined Patent Publication No. SHO 59-169739 (1984) in which a pair of clamp pawls for supporting the engine from both sides is provided. In this prior art, one clamp pawl is fixedly secured and the other clamp pawl is movably provided. Accordingly, even though a size of an engine supporting section is changed, the pair of clamping pawls can be used in common by adjusting the clamp pawl on the movable side.

Since the positional adjustment of the clamp pawl on the movable side is computer-controlled, the clamping device becomes complicated and expensive. It is therefore desirable that a device with a comparatively simple construction be provided in which the clamping operation can be efficiently performed by a manual operation. It is therefore an object of the present invention to meet such requirements as described above.

SUMMARY OF THE INVENTION

To solve the problems, a clamping device according to the present invention has a clamping section for clamping a workpiece movably provided on a guide shaft in the axial direction and is characterized in that a locking section for fixedly securing the clamping section in position on the guide shaft is provided to move on the guide shaft in a locking direction and in a unlocking direction and that the locking section forms a one way mechanism whereby when the locking section is moved in the locking direction, it prevents only the movement of the clamping section in the unclamping direction relative to the workpiece and when the locking section is moved in the unlocking direction, it makes the movement of the clamping section free.

In this case, the one way mechanism can be composed of an inclined plane formed on one side of fitting sections in which each part of the clamping section and the locking section is fitted into one another in a relatively slidable manner, a supporting recession long in the axial direction of the guide shaft formed on the other side facing the inclined plane, a lock ball housed in the supporting recession to axially move between the inclined plane and the guide shaft, a first spring adapted to bias the lock ball in the locking direction, and a second spring adapted to bias the locking section in the locking direction relative to the clamping section.

In the present invention, when the clamping section is manually moved on the guide shaft to move the locking section in a locking direction in a clamping position of a workpiece, only the movement of the clamping section in the unclamping direction is prevented to be in a locking position.

Further, in this locking position, if the locking section is moved in the unlocking direction, locking by the one way mechanism is released to allow the clamping section to move on either side in the axial direction of the guide shaft. In this manner, support or release of the workpiece can be effected in a single operation. Thus, it is possible to realize a clamping device with a relatively simple construction at a low cost. It is also possible to improve a working efficiency in a clamping operation.

Further, the one way mechanism comprises the inclined plane provided on one side of the fitting sections, the supporting recession provided on the other side thereof, the lock ball housed in the supporting recession, the first spring for biasing the lock ball in the locking direction, and the second spring for biasing the locking section in the locking direction. Accordingly, once the locking section is released, it is moved in the locking direction by the second spring to push the lock ball against the inclined plane, thereby bringing the one way mechanism into a locking condition. On the contrary, if the locking section is pulled in the unlocking direction against the second spring, the lock ball is separated from the inclined plane to bring the one way mechanism into an unlocking condition, thereby unclamping the lock ball by a single operation.

DETAILED DESCRIPTION OF THE PREFERRED EMBODIMENTS

Figure 1:
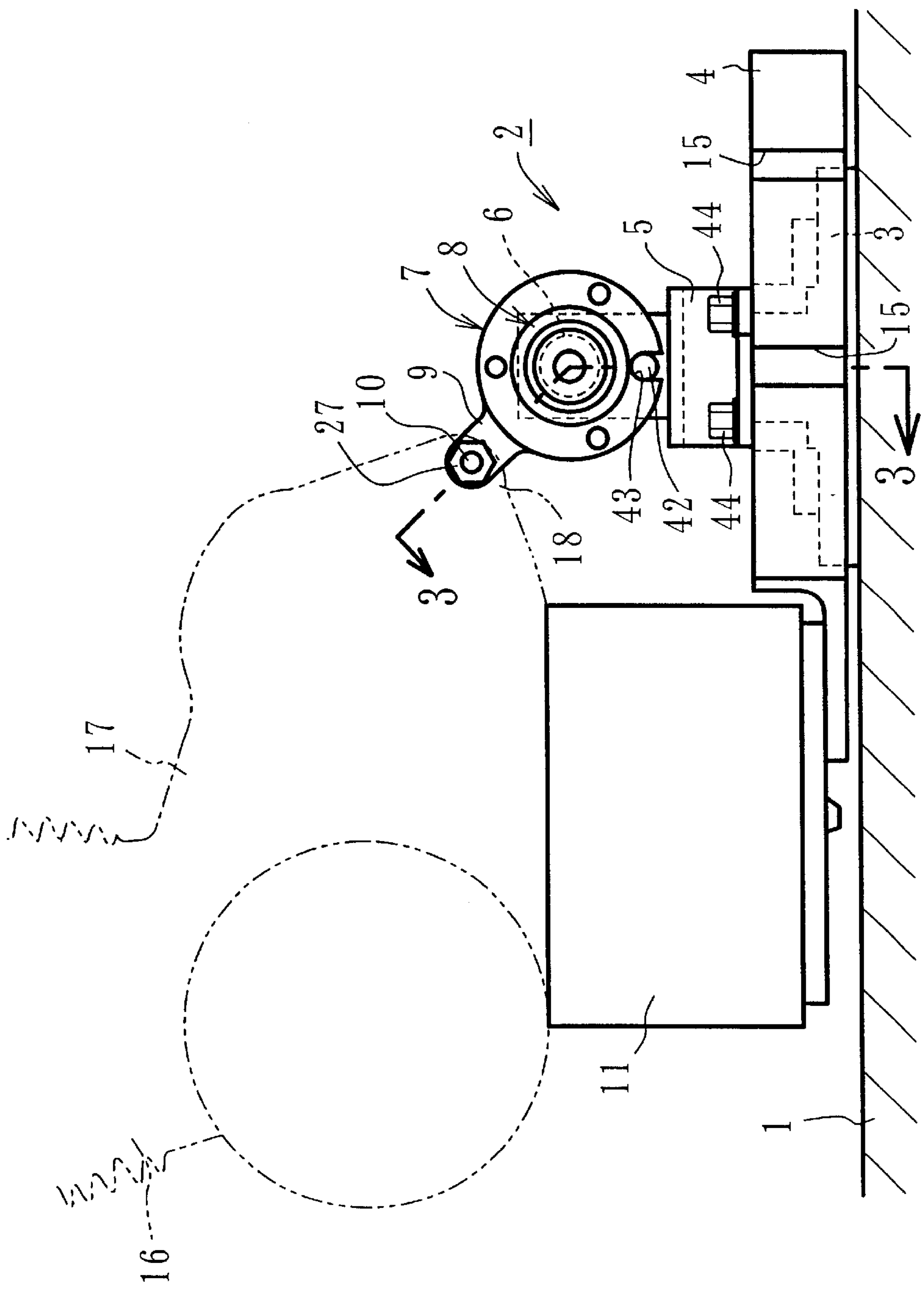
FIG. 1 is a front view showing an entire clamping device according to the present invention.
Figure 2:
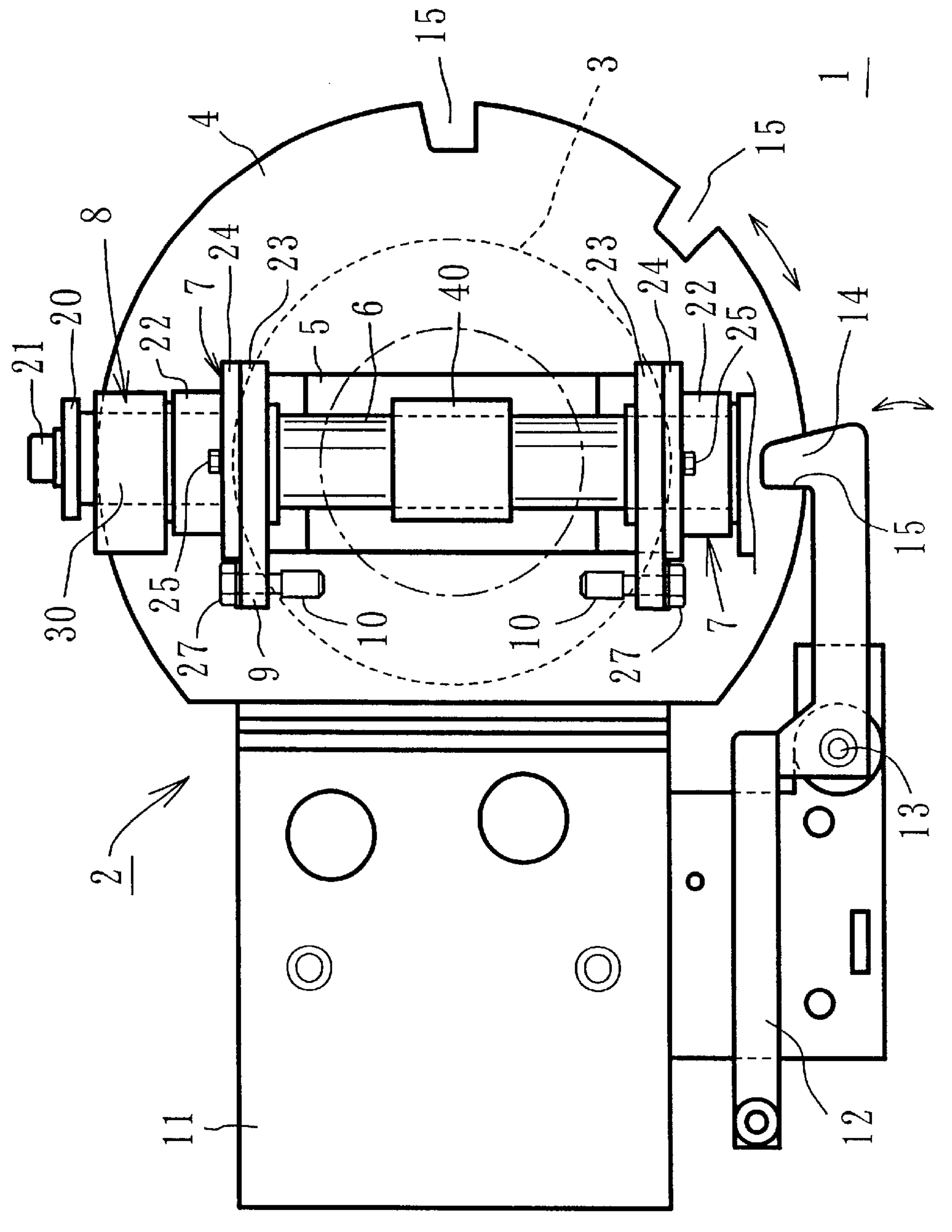
FIG. 2 is an enlarged plan view of the clamping device.
Figure 3:
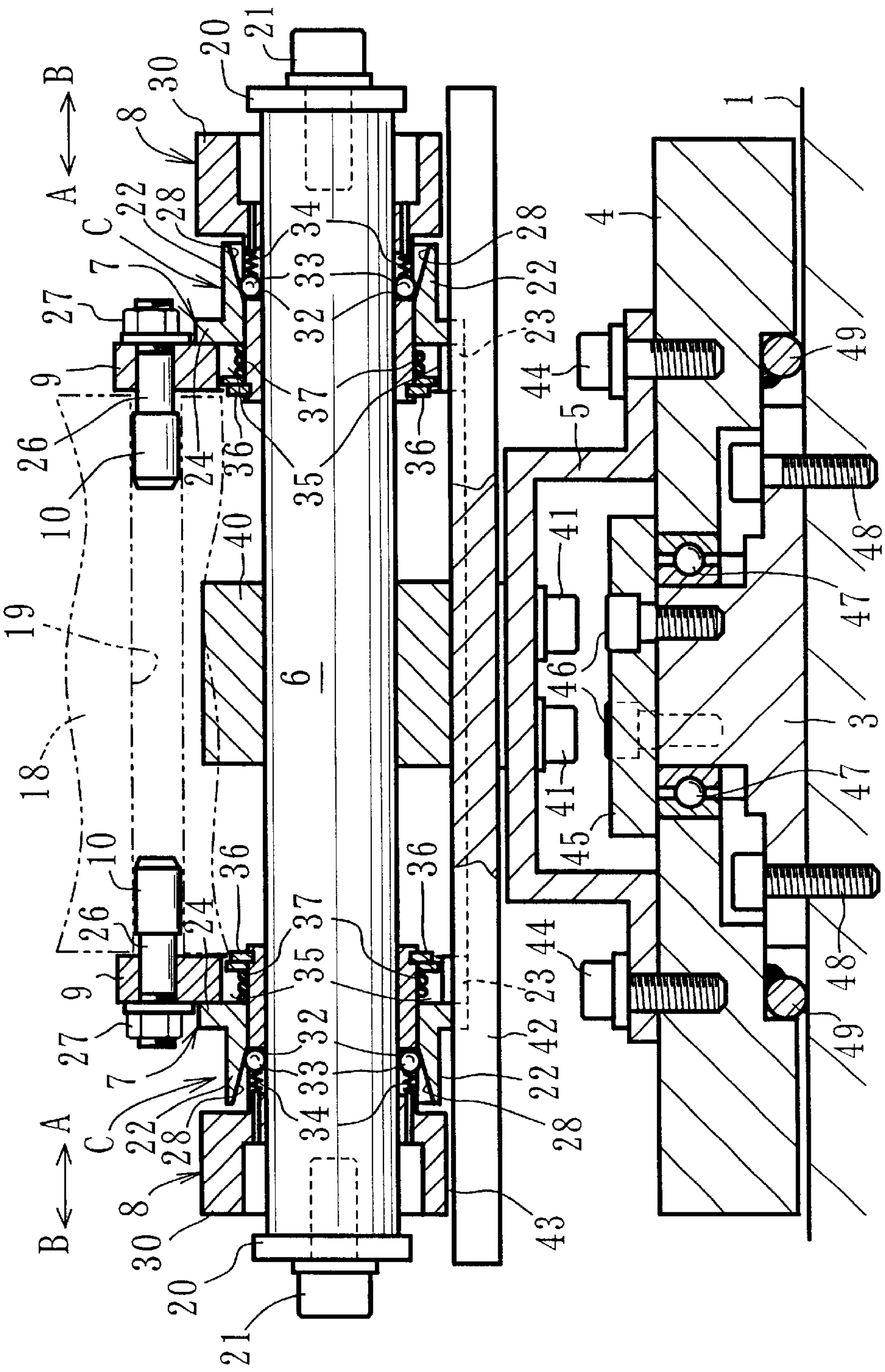
FIG. 3 is an enlarged cross-sectional view taken along the line 3—3 of FIG. 1.
Figure 4:
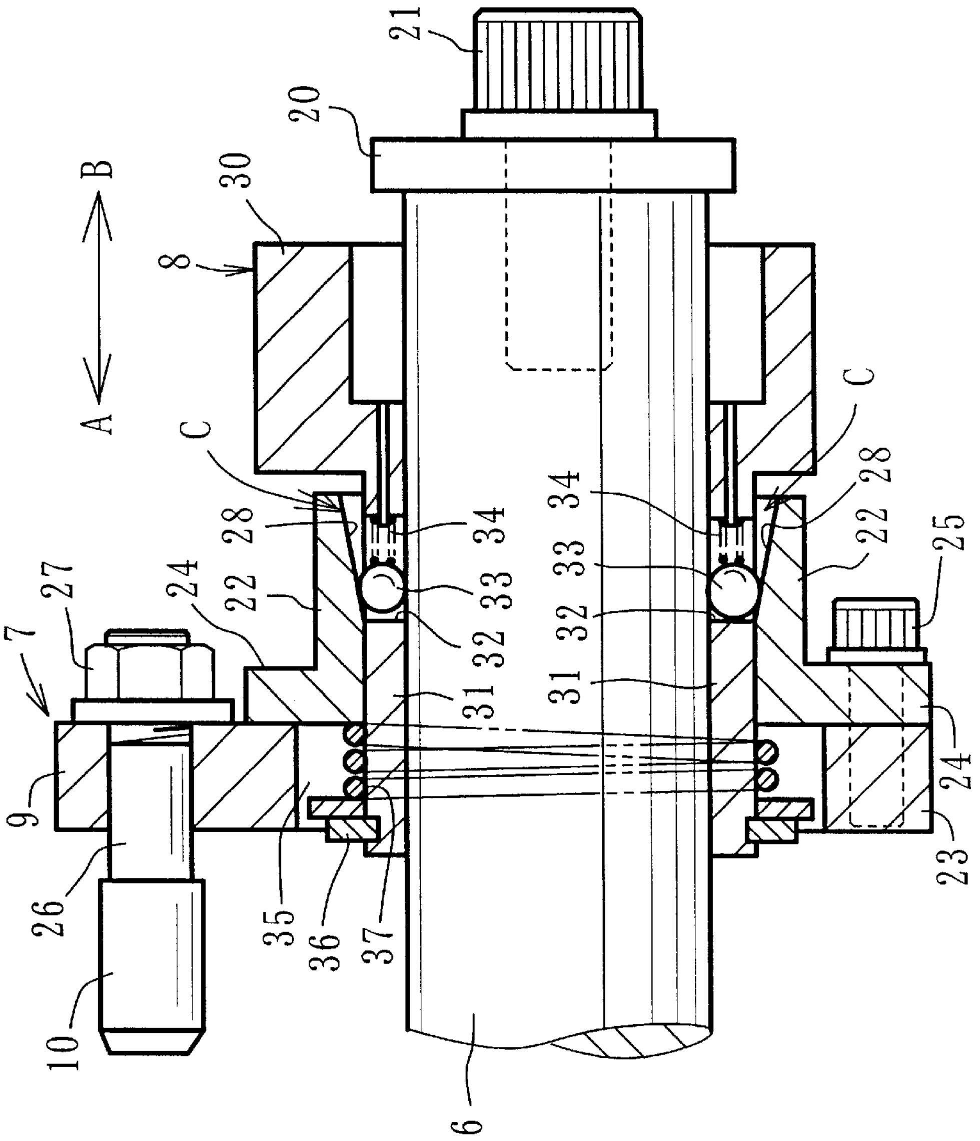
FIG. 4 is an enlarged view showing a one way mechanism.

One embodiment of the present invention will now be explained with reference to the accompanying drawings. FIG. 1 is a front view showing an entire clamping device of the present embodiment and FIG. 2 is an enlarged plan view thereof FIG. 3 is an enlarged cross-sectional view taken along the line 3—3 of FIG. 1. FIG. 4 is an enlarged view of a one way mechanism.

Referring first to FIGS. 1 and 2, a clamping device 2 is mounted on a work bench 1. The clamping device 2 comprises a base 3 fixedly secured to the work bench 1, a rotating table 4 rotatably supported by the base 3, a supporting platform 5 fixedly secured onto the central section of the rotating table 4, a guide shaft 6 of which the central section is secured to the supporting platform 5 and which extends in the diametric direction crossing above the rotating table 4, and a clamping section 7 and a locking section 8 each provided to make a pair on each end of the guide shaft 6 in the axial direction. The clamping section 7 has an arm section 9 projecting in the radial direction and the arm section 9 is provided with a clamp pawl 10.

A work bench 11 integrally formed with the rotating table 4 is also provided. The work bench 11 is made of a suitable plastic material which is softer than the rotating table 4. As shown in FIG. 2 (not shown in FIG. 1), a rotation lock member 12 for the rotating table 4 is provided on the work bench 1 to rotate around a central axis 13. The rotation lock member 12 is provided on its one end with a lock pawl 14 which engages engaging recessions 15 formed on the outer periphery of the rotating table 4 to perform rotation and rotational positioning of the rotating table 4.

Mounted on the work bench 11 is a crank case 17 of a motorcycle engine 16 which is a workpiece. The crank case 17 is provided with an engine hanger section 18 projecting from the rear end section thereof and supported between a pair of clamp pawls 10 which are adapted to engage an installation opening 19 (see FIG. 3) formed on the engine hanger 18 from both sides.

As fully shown in FIGS. 3 and 4, the clamping section 7 and the locking section 8 in the clamping device 2 are respectively provided apart to make a pair on each side of the guide shaft 6 and adapted to axially move along the guide shaft 6 in the direction of the arrow A or in the direction of the arrow B. In the locking section 8, the direction of the arrow A is a locking direction, while the direction of the arrow B is an unlocking direction. Stopper plates 20 are installed on each end of the guide shaft 6 by bolts 21 to prevent the locking section 8 from coming out.

The clamping section 7 and the locking section 8 form a one way mechanism C. In FIG. 4 in which one side of the one way mechanism is shown, the clamping section 7 is provided with a substantially cylindrical outer guide 22 and a substantially disk-like clamp base 23. An outer periphery of the clamp base 23 is put on top of a flange section 24 integrally formed with the outer guide 22 to be fastened by a bolt 25 for integration. Part of the clamp base 23 is extended in the radial direction to serve as the arm section 9 through which a small diameter section 26 of the clamp pawl 10 on one side is passed. Part of the small diameter section 26 is provided with the thread of a screw to be firmly fastened by a nut 27.

The outer guide 22 is provided on its inner periphery with an inclined plane 28 gradually expanding outside in the radial direction toward the axial end of the guide shaft 6. The locking section 8 is integrally to move formed with a large diameter section 30 of which the outer periphery is knurled for hand gripping during operation and a small diameter section 31 adapted to engage the inner periphery of the outer guide 22 to axially extend along the guide shaft 6. A long opening 32 is formed on a part of the small diameter section 31 facing the inclined plane 28.

The long opening 32 corresponds to a supporting recession of the present invention. A plurality of openings is provided long in the axial direction of the guide shaft 6 and at regular intervals in the circumferential direction thereof. Housed in the long opening 32 is a lock ball 33 which is movable in the longitudinal direction within the long opening 32. The lock ball 33 is biased to move in the direction of the arrow A by a first spring 34 and pushed against the narrowest section (i.e., the bottom) of the inclined plane 28.

One end of the small diameter section 31 passes through the outer guide 22 to extend into a large diameter opening 35 provided on the inner periphery of the clamp base 23. A second spring 37 is compressed between a clip 36 provided on the extended end of the small diameter section 31 and the flange section 24 to bias the clamping section 7 in the direction of the arrow B and the locking section 8 in the direction of the arrow A for relative movement.

Accordingly, in a condition shown in figure in which the locking section 8 is released, the outer guide 22 is biased to move in the direction of the arrow B by the second spring 37. At the same time, the small diameter section 31 is biased to move in the direction of the arrow A and a lock ball 33 is biased to move in the direction of the arrow A by a first spring 34. In this manner, the lock ball 33 is strongly pressed against the surface of the inclined plane 28 and the guide shaft 6 so that the clamping section 7 and the one way mechanism itself are locked on the guide shaft 6. As a result, further movement of the clamping section 7 in the direction of the arrow B is prevented to be in a lock condition.

However, the movement of the clamping section 7 in such a lock condition is prevented only in the direction of the arrow B. On the contrary, the movement thereof in the direction of the arrow A is permitted. A locking mechanism of one way system is thus realized. In this case, if the locking section 8 is pulled in the direction of the arrow B against the second spring 37, the lock ball 33 moves in the direction of the arrow B together with the smaller diameter section 31. As a result, pressure contact of the lock ball 33 to the surface of the inclined plane 28 and the guide shaft 6 is released to make the movement of the clamping section 7 in the direction of the arrow B possible. An unlocking condition is thus realized.

Reference numeral 40 of FIG. 3 is a center pillar for supporting a central section of the guide shaft 6 and fixedly secured onto the supporting platform 5 by bolts 41. Reference numeral 42 is a locking shaft provided parallel to and with almost the same length as the guide shaft 6. Each end of the locking shaft 42 is adapted to engage with a locking groove 43 (see FIG. 1) provided on the clamp base 23, thereby keeping the position of the clamp pawls 10 constant.

Reference numeral 44 is a bolt for securing the supporting platform 5 onto the rotating table 4. Reference numeral 45 is a stopper plate secured onto a central section of the base 3 by a bolt 46 to keep a ball bearing 47 provided in an upper joint between the base 3 and the rotating table 4 in position. Reference numeral 48 is a bolt for mounting the base 3 on the work bench 1 and 49 is a sliding member (i.e., a round bar) provided under the sliding table 4.

Operation of the present invention will now be explained. As shown in FIG. 1, when the motorcycle engine 16 is fixedly secured onto the work bench 1, the crank case 17 of the motorcycle engine 16 is mounted on the work bench 11. Then, the engine hanger section 18 is inserted into the one way mechanism of which the space or interval is fully secured in advance. As shown in FIG. 3, the left and right clamping sections 7 are pushed to let them come closer to each other (i.e., in the direction of the arrow A) to allow the clamp pawls to engage the inside of the installation opening 19. When let go off the clamping sections 7 at this stage, the one way mechanism is fixedly secured in this position to make the movement in the direction of the arrow B impossible and thus, the engine hanger section 18 is firmly secured in position.

When the clamp pawls 10 are disengaged from the engine hanger section 18, if the locking section 8 is moved in the direction of the arrow B to have the unlocking condition, the clamping section 7 can be freely moved in the direction of the arrow B for disengagement. Accordingly, it is possible to provide the clamping device with a comparatively simple construction in which the clamping and unclamping operation are performed fast and easily.

In addition to the above, the position of the one way mechanism can be adjusted by a single operation and the interval between the right and left one way mechanisms can also be adjusted without restraint. Accordingly, even though the width of the engine hanger section 18 has been changed, the one way mechanism can be used in common to increase flexibility or a wide use.

Further, if the rotating table 4 is rotated by the operation of the rotating lock member 12, it is possible to freely rotate the motorcycle engine 16 on the work bench 1 in a clamping condition and improve the workability. Still further, since the clamp base 23 is provided with the locking mechanism 43 to engage the locking shaft 42, it is possible to move the clamp pawl 10 keeping the position constant. Thus, clamping operation can be firmly carried out.

What is claimed is:

1. A clamping device having a clamping section for clamping a workpiece movably provided on a cylindrical guide shaft along the axis of the guide shaft, wherein the clamping section and a locking section are each provided to make a pair at ends of the guide shaft and the locking section is fixedly secured to the clamping section in position on the guide shaft and is provided to move in a locking direction and in an unlocking direction on the guide shaft and forms a one way mechanism whereby when the locking section is moved in the locking direction, the locking section prevents movement of the clamping section only in an unclamping direction relative to the workpiece and when the locking section is moved in the unlocking direction, the locking section makes the movement of the clamping section free.

2. The clamping device according to claim 1, wherein the one way mechanism comprises an inclined plane formed on one side of fitting sections in which each part of the clamping section and the locking section is fitted into one another in a relatively slidable manner, a supporting recession long in the axial direction of the guide shaft formed on the other side facing the inclined plane, a lock ball housed in the supporting recession to be axially movable between the inclined plane and the guide shaft, a first spring adapted to bias the lock ball in the locking direction, and a second spring adapted to bias the locking section in the locking direction.

3. A clamping device mounted on a workbench, the clamping device comprising:

a base fixedly secured to the workbench;

a rotating table rotatably supported by the base;

a supporting platform fixedly secured on the rotating table;

a guide shaft which is secured to the supporting platform; and a clamping section and a locking section, each provided to make a pair on ends of the guide shaft in the axial direction.

4. The clamping device of claim 3, wherein the clamping section includes an arm section having a clamp pawl.

5. The clamping device of claim 3, wherein the rotating table includes a rotation lock member having a lock pawl which engages recessions formed on the rotating table.

6. The clamping device of claim 3, wherein the clamping section and the locking section move along the guide shaft along the axis of the guide shaft.

7. The clamping device of claim 3, wherein a stopper plate is installed at each end of the guide shaft to prevent the locking section from coming out of the guide shaft.

8. The clamping device of claim 3, wherein the clamping section includes a substantially cylindrical outer guide and a substantially disk-shaped clamp base.

9. The clamping device of claim 3, wherein the locking section includes a large diameter section and a small diameter section which engages an inner periphery of the outer guide.

10. The clamping device of claim 3, wherein the guide shaft includes a plurality of openings along the axial direction of the guide shaft and at regular intervals in a circumferential direction of the guide shaft.

11. The clamping device of claim 3, wherein an opening is formed on a small diameter section of the guide shaft, the opening including a lock ball which is movable by a first spring and pushed against the inclined plane.

12. The clamping device of claim 11, wherein a large diameter opening is provided on the clamp base, where a second spring is compressed between a clip provided on the small diameter section and the flange section.

13. The clamping device of claim 3, further including a pillar which supports the guide shaft and is fixedly secured on the supporting platform by bolts.

* * * * *